United States Patent [19]

Fawcett et al.

[11] Patent Number: 5,779,842
[45] Date of Patent: Jul. 14, 1998

[54] FORMING AN EROSION RESISTANT COATING ON AN ELECTRODE

[75] Inventors: Nigel Fawcett, London; Richard Knowles, Middlesex, both of United Kingdom

[73] Assignee: Ford Global Technologies, Inc., Dearborn, Mich.

[21] Appl. No.: 687,573
[22] PCT Filed: Jan. 25, 1995
[86] PCT No.: PCT/GB95/00143
   § 371 Date: Nov. 15, 1996
   § 102(e) Date: Nov. 15, 1996
[87] PCT Pub. No.: WO95/20256
   PCT Pub. Date: Jul. 27, 1995

[30] Foreign Application Priority Data

Jan. 25, 1994 [GB] United Kingdom ............... 9401406

[51] Int. Cl.$^6$ ............... B32B 31/14; H01T 21/02
[52] U.S. Cl. ............... 156/250; 156/272.2; 228/262.9; 445/7
[58] Field of Search ............... 445/7; 156/256, 156/250, 272.2, 308.2, 87; 428/337, 344, 347, 355 R, 343, 137; 228/262.9

[56] References Cited

U.S. PATENT DOCUMENTS 5,348,215  9/1994  Rafferty et al. ............... 228/181
5,578,365  11/1996  Kume et al. ............... 428/195

FOREIGN PATENT DOCUMENTS 0 270 746  6/1988  European Pat. Off. ............... 228/181

OTHER PUBLICATIONS

McDonald, Robert J., "Metal Powders –Their Role in Brazing is characterized by flexibility and freedom to select a wider range, as to both performance and cost, of filler metal compositions", Welding Journal, vol. 50, pp. 327–331, May 1971.

*Primary Examiner*—David A. Simmons
*Assistant Examiner*—Linda L. Gray
*Attorney, Agent, or Firm*—Joseph W. Malleck

[57] ABSTRACT

A method of coating an area of an electrode with an erosion resistant material. The method comprises bringing into contact with the area a web which contains the erosion resistant material and which carries an adhesive so that the web adheres to the electrode. The electrode and the adhered web are then heated to a temperature high enough to cause the adhesive to decompose, volatilize, or both such that the adhesive is substantially eliminated from the web and such that the erosion resistant material fuses and bonds to the electrode.

14 Claims, 4 Drawing Sheets

FORMING AN EROSION RESISTANT COATING ON AN ELECTRODE

BACKGROUND OF THE INVENTION

1. Field of the Invention

This invention relates to the formation of an erosion resistant coating on a pre-selected area of a spark plug electrode, for example the tip of one or more electrodes of a spark plug for use in an internal combustion engine. The invention also provides a spark plug in which one or more electrodes are provided with a tip coated in accordance with this method.

In order to achieve greater spark plug life and/or to allow the area of the electrode to be reduced to produce more efficient ignition, it is desirable to place at the electrode tips an erosion resistant material. One suitable material is platinum, but any material which is more resistant to erosion than INCONEL metal (alloy of 9% by wt Fe, 15% Cr and 76% Ni) may be used. INCONEL metal is a material that is conventionally used for spark plug electrodes and the name INCONEL is a registered trademark.

2. Discussion of Related Art

It is known from U.S. Pat. No. 4,180,220 to apply the platinum or other erosion resistant material using a spherical body of platinum which is welded onto the respective base electrodes. However these spheres are necessarily of small size and therefore difficult to handle. Similar methods are known using platinum discs rather than spheres. It is also known from U.S. Pat. No. 4,705,486 to weld a strip of platinum ribbon to the electrode. It is also known from European patent application number 90912755.7 to form a pellet of erosion resistant material on the tip of an electrode by welding a wire to the tip and severing the wire, and then to carry out successively a coining operation to flatten the pellet and a second welding process to force the pellet into the material of the electrode.

In all these methods it has proved difficult to protect a large area of electrode with the erosion resistant material.

SUMMARY OF THE INVENTION

According to the present invention there is provided a method of manufacturing a spark plug electrode which is coated in a pre-selected area with an erosion resistant material, which method including the steps of:

a) bringing into contact with the area of the electrode that is to be coated, a web which contains the erosion resistant material and which carries a thermally decomposable and/or volatilisable adhesive on one surface, so that the web adheres to the electrode;

b) heating the electrode/web combination to a temperature high enough to cause the adhesive to decompose and/or volatilise so that the adhesive is substantially eliminated from the electrode/web combination, and to fuse at least some of the erosion resistant material so that it bonds to the electrode.

By applying the erosion-resistant material to the electrode in the form of a web it is possible to control the area of application and the thickness of the coating. The process facilitates the coating of large areas of an electrode.

It is preferred that the web is provided on a reel, and that the web is cropped (cut) to separate the part of the web that is adhered to the electrode from the remainder of the web on the reel. The cropping step may be carried out at any stage of the process, but it is preferred that the cropping is carried out after step a) and before the heating step.

The web may have an adhesive coating on only one surface, or the web may have an adhesive coating on more than one surface. It is also possible for the web to have adhesive distributed throughout its structure so that cutting or breaking the web provides fresh adhesive surfaces where the web has been cut or broken. Preferably the web is relatively thin; however the web may be of any preferred dimensions. For example the web may comprise a rod which has adhesive distributed throughout its length so that one end of the rod may be brought into contact with an electrode, for example the tip of a centre electrode of a spark plug, so that it adheres to the centre electrode. The rod may then be cut so as to leave a disc adhered to the centre electrode for the heating stage b). For convenience hereinafter the invention will be described in terms of the use of a thin, flexible web with one adhesive coated surface and one non adhesive coated surface.

The web may be coiled so that the adhesive coated surface is in contact with the non adhesive coated surface. However this may make unreeling difficult, so it is preferred to interpose a release layer of material between the adhesive coated surface and the non adhesive coated surface. The release material is preferably a film or tape which is readily removable from the adhesive coated surface. Such materials are well known. For example the release material may be poly(ethylene terephthalate) or a paper tape which has a silicone coating.

Where the web includes a release coating the method will include the further step of removing the release coating from the part of the web that is to adhere to the electrode prior to adhering the web to the electrode.

A second protective layer may also optionally be provided in contact with the non adhesive coated surface of the web. Where the web includes this second protective layer it is preferred that the method includes the further step of removing the protective layer prior to adhering the web to the electrode.

Preferably the web is constructed so as to facilitate the ablation, volatilisation or other means for the adhesive to escape to atmosphere. This may be achieved by making the erosion resistant material discontinuous within the web.

The discontinuity of the erosion resistant material may be provided by perforating a web comprising a strip of the erosion resistant material. Alternatively the web may comprise a matrix of particles of the erosion resistant material and a thermally decomposable and/or volatilisable binder. Any suitable binder may be used, for example acrylics, natural or synthetic rubbers, cellulosics, poly(vinyl alcohol) or shellac. Where a binder is used, it is preferred that the binder is decomposed and/or volatilised at temperatures similar to those at which the adhesive is decomposed and/or volatilised.

The erosion resistant material may be, for example: platinum, rhodium, iridium, chromium, nickel aluminide, or alloys of these metals. A preferred erosion resistant material is platinum.

The erosion resistant material may comprise a plurality of chemical species. For example it may comprise a mixture of particles of platinum and chromium, or chromium and nickel, in order to reduce cost, produce an erosion resistant coating with different melting point components, or for other reasons. For example the erosion resistant material may comprise a mixture of particles of nickel and aluminium which react to form nickel aluminide during the heating stages.

When the electrode is a spark plug electrode, it is desirable for the erosion resistant material to have a high melting point, to help resist the high temperatures encountered in the generation of sparks and in an engine cylinder. For the process of coating the erosion resistant material onto the electrode, however, it is desirable that the material have a relatively low melting point so that it may readily be processed without the possibility of thermal deformation of the electrode.

In order to achieve low processing temperature and a high melting point of the final coating, it is preferred that the erosion resistant material is combined with a substance in an alloy with a lower melting point than that of the erosion resistant material, which substance volatilises or diffuses during the heating process to leave an erosion resistant material of substantially higher melting point than the melting point of the alloy. For example, if the erosion resistant material is platinum, combining this with boron may produce an alloy with a markedly reduced melting point. The melting point of pure platinum is around 1770° C., but the melting point of a platinum/boron alloy may be reduced to below 1000° C. The use of the platinum/boron alloy allows the heating step b) to be carried out at a relatively low temperature. During the heating step boron diffuses or volatilises from the alloy to leave a matrix of substantially pure platinum with a high melting point. Diffusion of boron out of the platinum may also be allowed to occur in a spark plug which is in service in an service. This allows the use of shorter heating times during fabrication of the erosion resistant coating, and hence lower production costs.

In order to improve erosion resistance and provide asperities to lower the breakdown voltage of the electrode system, particles of a high melting metal may be mixed with the erosion resistant material. For example particles of iridium may be mixed with a platinum-based erosion resistant material. The melting point of the lower melting material may be further reduced by alloying it with a melting point reducing substance as described above.

The erosion resistant material may also be alloyed with materials to modify the coefficient of thermal expansion of the coating in order to reduce the stresses caused by differential thermal expansion of the coating and the electrode substrate. Examples of such materials are nickel and iridium.

The erosion resistant material may also be alloyed with materials to increase the ultimate tensile strength of the coating in order to increase the thermal fatigue resistance of the coating. Examples of suitable materials are nickel and iridium.

Rare earth particles may be added to the erosion resistant material to lower the alloy work function and hence enable easier sparking to the electrodes of a spark plug. Examples of suitable rare earth particles include oxides of yttrium or cerium; thorium may also be used to achieve the reduced work function.

The adhesive may be any suitable adhesive; for example a natural or synthetic rubber, an acrylic, or cellulosic material. The binder and the adhesive may be chemically similar, or they may be dissimilar.

The web may be of any suitable thickness provided that it carries a sufficient quantity of the erosion resistant material to form a coating of the erosion resistant material on the desired area of the electrode. A preferred thickness for the coating on the electrode is in the range 5–400 μm. The coating thickness which is particularly preferred in specific cases will depend upon the chemical composition of the erosion resistant material. The more erosion resistant the coating is, the thinner the coating may be. The use of thinner coatings also allows cost savings on materials. The platinum group metals have relatively high erosion resistance. For higher concentrations of platinum group metals it is preferred that the coating be in the range 40–70 μm. For alloys where platinum group metals are absent or present in relatively low concentrations (less than about 25%), a preferred coating thickness is in the range 50–400 μm.

The web is preferably provided with at least one backing tape which is release-coated and which is removably adhered to the adhesive prior to the use of the web in the process. The process will then include the further step of removing the backing tape prior to bringing the web into contact with the electrode.

The heating step b) may be carried out at any suitable temperature high enough to decompose and/or volatilise the adhesive and melt or sinter at least some of the erosion resistant material. Typically decomposition and/or volatilisation of the adhesive will require a temperature in the range 200°–500° C. Melting of the erosion resistant material typically requires a higher temperature than the temperature to decompose and/or volatilise the adhesive. However, as described above, the melting point of the erosion resistant material may be reduced by the addition of one or more additives.

Where two or more erosion resistant materials are mixed in the web one may have a high melting point, for example chromium, iridium, or nickel aluminide, and the other may have a relatively low melting point, for example a nickel-based braze alloy powder. The heating in step b) may then melt the lower melting material, but not the higher melting material. On cooling, the lower melting material functions as a glue or solder to stick the particles of higher melting material to the electrode and to each other. This may be useful where the lower melting material is not sufficiently erosion resistant on its own to form a long-lasting erosion resistant coating but it is substantially protected from the atmosphere by particles of the higher melting material which are secured in it.

In this embodiment it is preferred that the higher melting particles make up most of the volume of the erosion resistant material in the web, with the lower melting material present in just sufficient quantity to function as a glue. It is particularly preferred that the particles of the higher melting material be present in a range of particle sizes so as to facilitate even packing within the final erosion resistant coating. A preferred maximum particle size is in the range 0.05 to 0.5 mm, and the range 0.1 to 0.3 mm is particularly preferred.

The heating process may be combined with a pressing or stamping process to compact the erosion resistant material on the electrode or to coin the surface to produce asperities to lower gap breakdown voltage when the electrode is a spark plug electrode.

The electrode/web combination may be heated in a furnace, or by the use of induction heating, laser heating, welding apparatus or any other suitable source of high temperature. In a preferred embodiment, induction heating is used to heat the electrode/web combination.

The heating is preferably carried out in the absence of oxygen gas to inhibit the formation of oxidised products. This may be achieved by carrying out the heating in a complete or partial vacuum, or under an inert or reducing atmosphere, for example a nitrogen/hydrogen gas shroud. In order to reduce oxidation and/or to promote wetting of the electrode surface, one or more fluxes may also be included in the web composition.

Where the electrode is the centre electrode of a spark plug it is preferred that the exposed end of the electrode is entirely covered by the erosion resistant material. It is particularly preferred that the coating also covers some of each side of the centre electrode.

Where the electrode is the side or ground electrode of a spark plug, it is preferred that the erosion resistant material is coated over the inward facing surface of the tip, and it is particularly preferred that the coating also overlaps around the outward facing surfaces which adjoin the inward facing surface of the tip.

The web may be applied to the electrode by hand, and the web may also be cropped manually. For mass production it is preferred that the web be applied and/or cropped by means of a machine.

According to a second aspect of the invention there is provided a spark plug in which one or more electrodes are provided with a tip coated with an erosion resistant material in accordance with the method set forth above.

The erosion resistant coating is preferably of platinum.

The invention also extends to a web which contains an erosion resistant material and which carries a thermally decomposable or volatilisable adhesive on one surface, so that the web may be adhered to a pre-selected area of an electrode.

It is preferred that the thickness of the coating is in the range 5–400 μm, and particularly in the range 40–70 μm for alloys which consist of, or are rich in, platinum group metals. Where the erosion resistant material contains relatively small proportions of platinum group metals a preferred thickness is in the range 50–400 μm. In order to achieve the preferred coating thickness, it is preferred that the web contain a total thickness of the erosion resistant material in the range 5–400 μm, and it is particularly preferred that the web contain a total thickness of erosion resistant material in the range 40–70 μm for an erosion resistant material which consists of, or is rich in, platinum group metals.

BRIEF DESCRIPTION OF THE DRAWINGS

The invention will now be further described, by way of example, with reference to the following drawings in which.

DETAILED DESCRIPTION OF THE PREFERRED EMBODIMENTS

Figure 1:
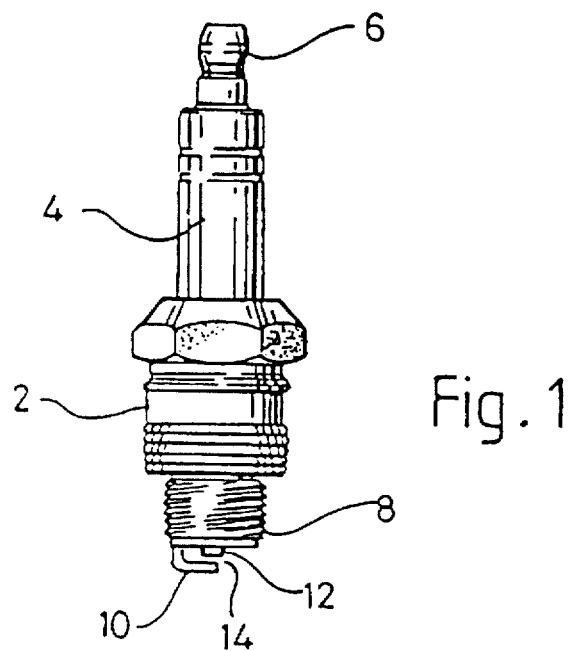
FIG. 1 shows a conventional spark plug for a motor vehicle engine.

The spark plug shown in FIG. 1 has a body 2, an insulator 4, a top contact or cap 6 and a shell 8. The shell 8 has threads by which the plug can be screwed into a tapped bore in a cylinder head, and a side electrode 10 is attached to the shell. A centre electrode 12 is insulated from the side electrode by the insulator 4, and a spark gap 14 is provided between the two electrodes.

Figure 2:
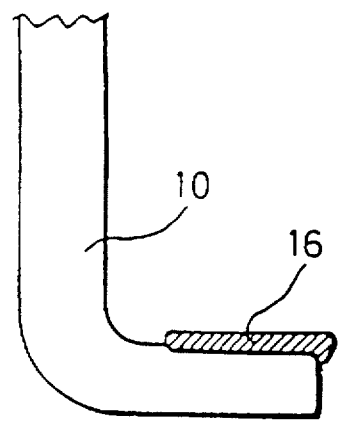
FIGS. 2 and 3 show views of the side electrode of a spark plug, the tip of which has been coated with an erosion resistant material in accordance with one aspect of the invention.
Figure 3:
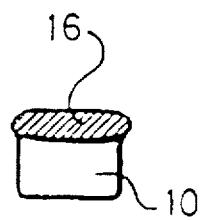

FIGS. 2 and 3 show a side electrode 10, the tip of which has been coated with an erosion resistant material 16 in accordance with the invention. The erosion resistant material is platinum, but any other suitable metal may be used. The platinum 16 is principally coated on the inward facing surface of the tip of the side electrode 10, and the coating extends to the bend in the electrode. The coating 16 does overlap to a small extent the adjoining outward facing surfaces.

Figure 4:
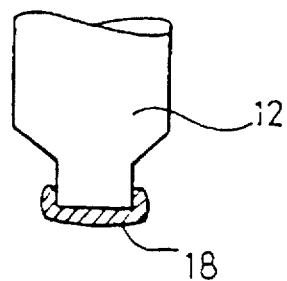
FIG. 4 shows a centre electrode, the tip of which has been coated with an erosion resistant material in accordance with a further aspect of the invention.

FIG. 4 shows a centre electrode 12, the tip of which has been coated with platinum 18 in a similar manner to that of the side electrode shown in FIGS. 2 and 3.

A spark which is formed between the tips of the two electrodes 10 and 12 tends to erode the electrode in the areas where the platinum 16, 18 is coated. The platinum helps to resist erosion and thereby prolong the life of the spark plug.

Figure 5:
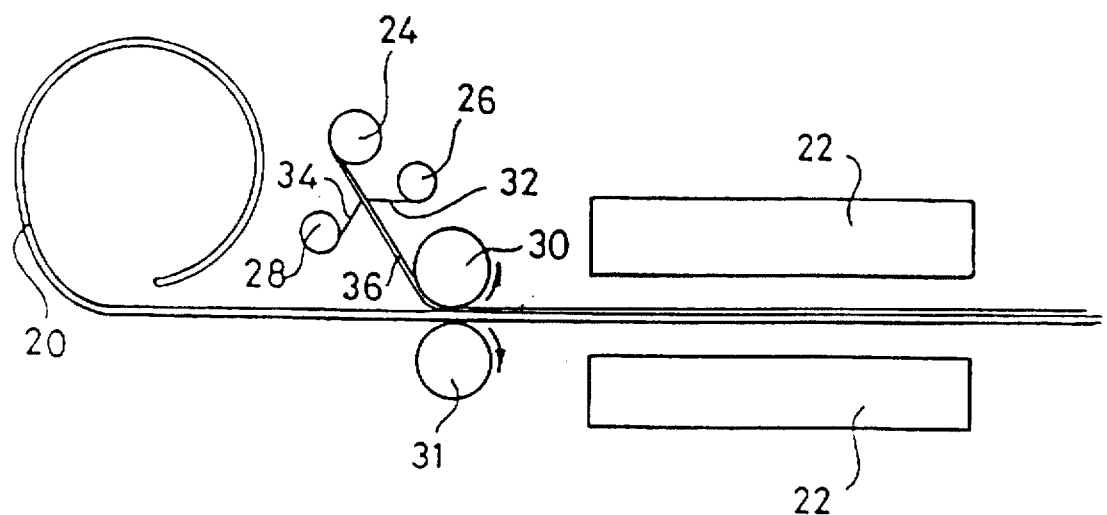
FIGS. 5 and 6 are respectively a side view and a view from above of stages of a process according to one embodiment of the invention.

FIG. 5 shows an electrode substrate 20 from which will be formed side electrodes 10. The substrate 20 is fed through a furnace 22 in an inert nitrogen atmosphere. A reel of tape 24 comprises a web 36 of particles of an alloy of platinum and boron in an ethyl cellulose binder, an adhesive layer, and two protective layers 32 and 34, one on either side of the web. Two rollers 26 and 28 are provided for the removal of the protective layers 32 and 34, and two nip rollers 30 and 31 press the adhesive side of the web 36 against the substrate 20 to cause the web to adhere to the substrate. Passage through the furnace heats up the web and the substrate so that the binder and the adhesive decompose and/or volatilise, leaving platinum on the substrate. Further heating to the fusing temperature of the alloy causes it to melt or sinter and coat the substrate. Boron diffuses or volatilises from the alloy during the heating process to leave a coating of substantially pure platinum on the surface of the substrate.

Figure 6:
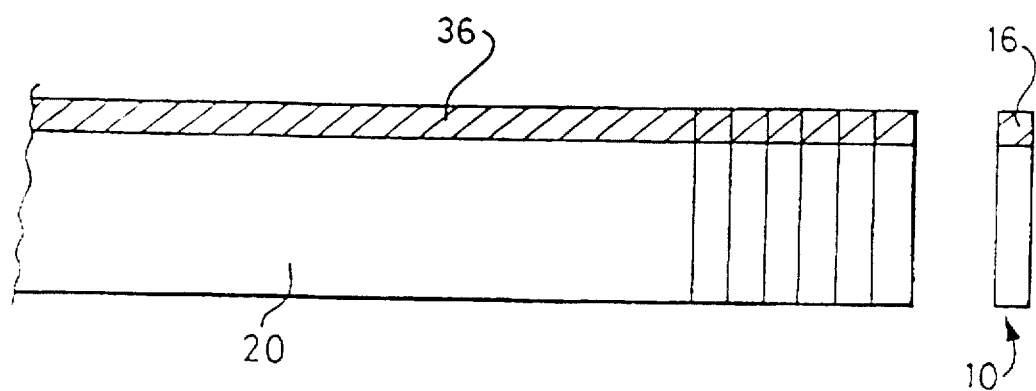

FIG. 6 shows that the web 36 coats the substrate 20 on one edge. Cropping of the substrate 20 produces a side electrode 10 with a tip coated with platinum 16. The side electrode 10 is now bent to a suitable angle and attached to the shell 8 so that the platinum coating 16 faces inward to the spark plug.

Figure 7:
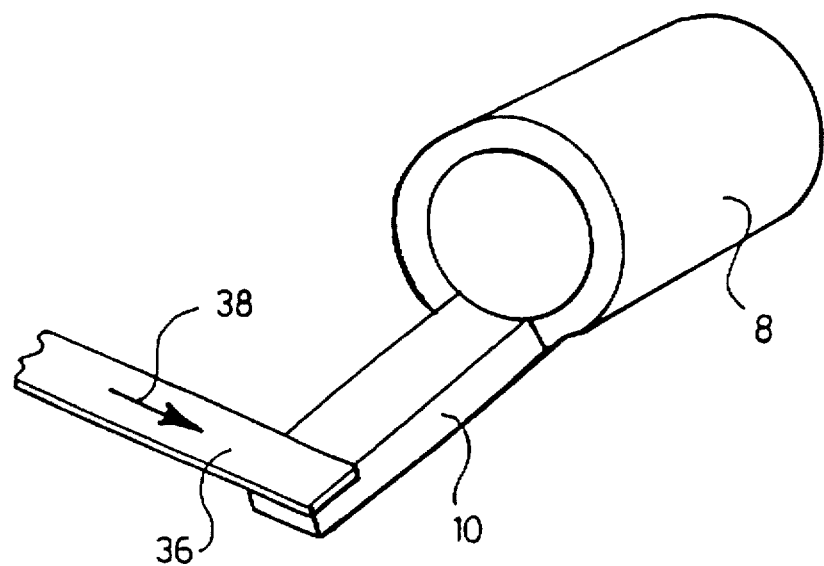
FIG. 7 is a perspective view of a stage in a process according to an alternative embodiment of the invention.
Figure 8:
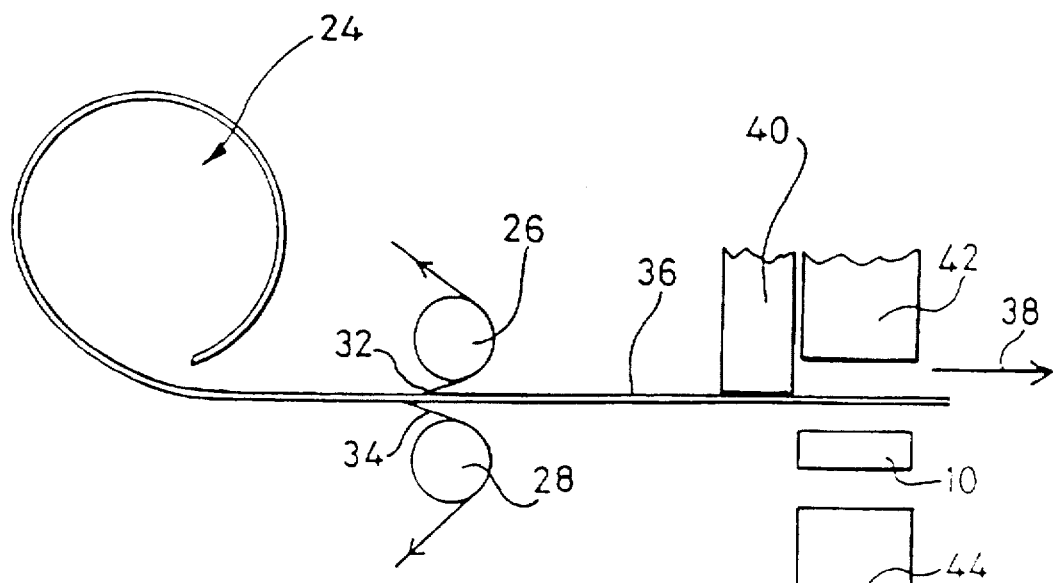
FIG. 8 is a side view of a different stage in the alternative embodiment of the process shown in FIG. 7.

FIGS. 7 and 8 show steps in an alternative embodiment of the process for coating the tip of a side electrode 10 with an erosion resistant coating.

A combined shell 8 and linear side electrode 10 are held in position with the tip of the electrode 10 between two compression members 42 and 44. An adhesive coated web 36, which comprises particles of a platinum/boron alloy in a binder, is moved in the direction of the arrow 38 so that it lies over the tip of the electrode 10 with the adhesive coated surface facing the electrode 10. The web is provided from a reel of tape 24, which has protective layers 32 and 34 peeled from its major surfaces by means of two rollers 26 and 28. A cropping member 40 is located adjacent the compression member 42.

In operation the compression members 42, 44 are moved together so as to hold and apply pressure to the tip of the electrode 10 and the adhesive coated web 36, thereby causing the web 36 to adhere to the electrode 10. The web 36, the compression members 42, 44, and the cropping member 40 are then moved in the direction of the arrow 38 by a distance corresponding to the width of the electrode 10. Relative movement between the cropping member 40 and the compression members 42, 44 now cuts the web 36 so as to leave a portion of the web 36 adhered to the tip of the electrode 10. The compression members 42, 44 are then moved apart and the electrode 10 is moved into a furnace or other heat source to remove the adhesive and binder, and to fuse the alloy and diffuse or volatilise the boron to give a substantially coherent coating of platinum on the electrode tip.

The cropping member 40 and the compression members 42, 44 are now returned to their original positions and a new shell 8 and electrode 10 are positioned between the compression members 42, 44 for the process to be repeated.

A similar process may be carried out to coat the centre electrode of a spark plug, by substituting the centre electrode 12 for the side electrode 10, so that the tip of the centre electrode 12 is brought into contact with the adhesive side of the web 36.

Alternatively, the web may be provided in the form of a rod or cylinder which has adhesive homogeneously distributed throughout its length. The cross sectional profile of the web may be selected so as to match that of the tip of the centre electrode. One end of the web is adhered to the tip of the centre electrode, and the web is then cut so as to a leave a disc of erosion resistant material adhering to the electrode for heating as described above.

Figure 9:
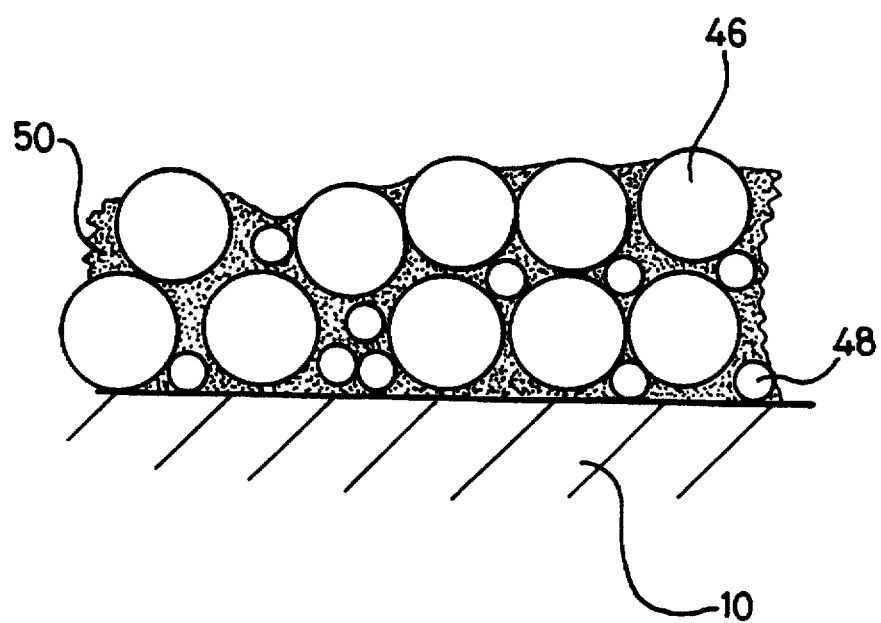
FIG. 9 is a sectional view of an electrode coating in accordance with a further aspect of the invention.

FIG. 9 is a sectional view of an erosion resistant coating in accordance with one embodiment of the invention. The coating was made and heat-treated as described in the examples above. The side electrode 10 has an erosion resistant coating which comprises larger 46 and smaller 48 particles of iridium which have been secured to the electrode 10 and to each other by a nickel based braze alloy 50. We have found that AMS 4777C, solidus 971° C., liquidus 999° C., works well as the braze alloy. The bulk of the coated volume is made up of iridium particles 46, 48, and the alloy 50 makes up the remaining volume. Although the alloy 50 may be gradually eroded over time when the spark plug is in use, at the top surface of the coating, most of the alloy 50 is not exposed and will remain protected below the iridium particles.

Although the invention has for convenience been described principally in terms of the use of platinum or iridium metal, it is not limited to these embodiments. Any suitable metal may be used provided that it is more erosion resistant than INCONEL metal. Alloys of platinum or of other metals may be used to reduce the melting point compared to the pure metal, or for other reasons. Similarly any binder material may be used to form the web provided that it is decomposed and/or volatilised when heated to a suitable temperature.

The invention provides a convenient method of applying an erosion resistant coating to a pre-selected area of a spark plug.

We claim:

1. A method of coating a pre-selected area of an electrode with an erosion resistant material, said method comprises the steps of:

a) bringing into contact with the area of the electrode that is to be coated, a web which contains the erosion resistant material and which carries an adhesive, on one surface, selected from the group consisting of a thermally decomposable adhesive, a thermally volatilizable adhesive, and an adhesive which is both thermally decomposable and thermally volatilizable, so that the web adheres to the electrode using the adhesive;

b) heating the electrode and the adhered web to a temperature high enough to cause the adhesive to decompose, volatilize, or decompose and volatilize so that the adhesive is substantially eliminated from the web, and to fuse the erosion resistant material so that the erosion resistant material bonds to the electrode.

2. The method as claimed in claim 1, wherein prior to the heating step the web is provided on a reel, and wherein the web is cut to separate the part of the web that is adhered to the electrode from the remainder of the web on the reel not adhered to the electrode.

3. A method as claimed in claim 1 wherein the heating step is combined with a pressing process to compact the erosion resistant material on the electrode, to provide surface asperities on the electrode resistant material, or both.

4. The method as claimed in claim 3, wherein the heating step is carried out in the absence of oxygen gas.

5. The method as claimed in claim 4, wherein the heating step is carried out under a nitrogen gas shroud.

6. The method as claimed in claim 1, wherein the heating step is an induction heating step.

7. The method as claimed in claim 1, wherein the electrode is a center electrode of a spark plug.

8. The method as claimed in claim 1, wherein the electrode is a side or a ground electrode side of a spark plug.

9. The method as claimed in claim 1, wherein the erosion resistant material is discontinuous within the web.

10. The method as claimed in claim 1, wherein the erosion resistant material is in the form of a matrix of particles and where the web also comprises a binder selected from the group consisting of a thermally decomposable binder, a thermally volatilizable binder, and a binder which is both thermally decomposable and thermally volatilizable.

11. The method as claimed in claim 1, wherein the erosion resistant material is combined with a substance to form an alloy where the alloy has a lower melting point than the melting point of the erosion resistant material, and wherein during the heating step the substance diffuses into said alloy or volatilizes away from said alloy to leave a material bonded to the electrode which comprises substantially said erosion resistant material having a higher melting point than the melting point of the alloy before the heating step.

12. The method as claimed in claim 1, wherein the erosion resistant material is platinum.

13. The method as claimed in claim 11, wherein the melting point reducing substance is boron.

14. A method as claimed in claim 1 wherein the thickness of the erosion resistant material is in the range 40–70 μm.

* * * * *